United States Patent
Karpowich et al.

Patent Number: 5,626,058
Date of Patent: May 6, 1997

[54] ROTARY ACTUATOR FOR A BICYCLE BRAKE

[76] Inventors: John W. Karpowich, P.O. Box 66100, Los Angeles, Calif. 90066; Scott A. Robinson, 3844 Anvil Dr., Colorado Springs, Colo. 80925

[21] Appl. No.: 546,142

[22] Filed: Oct. 20, 1995

Related U.S. Application Data

[63] Continuation-in-part of Ser. No. 427,264, Apr. 24, 1995, abandoned.

[51] Int. Cl.$^6$ .......................................................... B62L 3/00
[52] U.S. Cl. ........................... 74/489; 74/548; 74/551.1; 74/551.8
[58] Field of Search ................... 188/24.11, 24.15, 188/24.16, 24.18, 24.22, 2 D; 74/489, 502.2, 551.1, 551.8, 548, 551.7

[56] References Cited

U.S. PATENT DOCUMENTS

| | | | |
|---|---|---|---|
| 4,771,649 | 9/1988 | Modolo | 74/551.1 X |
| 4,966,047 | 10/1990 | Krauer et al. | 74/502.2 |
| 5,094,322 | 3/1992 | Casillas | 188/24.11 X |
| 5,301,570 | 4/1994 | Li | 74/551.1 |
| 5,392,669 | 2/1995 | Li | 74/502.2 |

FOREIGN PATENT DOCUMENTS

| | | | |
|---|---|---|---|
| 2535669 | 5/1984 | France | 74/502.2 |
| 2669001 | 5/1992 | France | 188/24.22 |

*Primary Examiner*—Josie Ballato
*Attorney, Agent, or Firm*—Laubscher & Laubscher

[57] ABSTRACT

A rotary actuator for a bicycle handbrake is characterized by a housing connected with a bicycle handlebar and an actuator rotatably connected with the housing. The actuator has a handle which extends radially from the axis of rotation of the actuator. A brake cable is connected with the actuator so that when the actuator is rotated in one direction, the cable is pulled to squeeze the brake calipers against the rim of a bicycle wheel, and when the actuator is rotated in the other direction, the cable is pushed to release the brake calipers. A releasable locking mechanism between the actuator and the housing is operable to lock the actuator in a brake release position and to release the actuator for rotation to apply the brake.

13 Claims, 2 Drawing Sheets

ROTARY ACTUATOR FOR A BICYCLE BRAKE

This application is based on Disclosure Document No. 330646 filed May 13, 1993. It is a continuation-in-part of application Ser. No. 08/427,264 filed Apr. 24, 1995, now abandoned.

BACKGROUND OF THE INVENTION

Bicycles have two types of braking systems. A foot operated bicycle brake operates in the hub of the rear wheel of the bicycle to stop the wheel from rotating. Hand-operated brakes rely on coaxial brake cables which actuate opposed calipers having pads which squeeze the rim of a bicycle wheel. Hand-operated brakes may be used on both the front and rear wheels to improve the braking capability of the bicycle rider. The present invention relates to a rotary actuator for a hand-operated braking system.

BRIEF DESCRIPTION OF THE PRIOR ART

Most conventional hand-operated bicycle brake actuators include a lever which the bicycle rider squeezes in the direction of the bicycle handlebar. The lever puts tension on the brake cable causing the brake calipers to close on the wheel rim. Squeezing of the levers is performed by the rider's fingers utilizing muscles primarily in the forearms. These conventional hand braking systems tire the rider's lower arms, wrists, and fingers which become sore, particularly during off-road and mountain riding.

Rotary actuators for hand-braking systems are known in the patented prior art as evidenced by the U.S. patents to Blancas U.S. Pat. No. 4,653,613 and Krauer et al U.S. Pat. No. 4,966,047. Both of these patents disclose rotary handlebar grips. A major drawback of these devices is that a high degree of gripping strength is required to apply adequate braking force, particularly where the bicycle is travelling at a high rate of speed. Moreover, the turning motion required to activate the brake places the rider in an awkward, unbalanced position and also strains the rider's wrist.

The present invention was developed in order to overcome these and other drawbacks of conventional hand-operated bicycle braking systems by providing a rotary actuator in the form of a lever which is easy to operate and which utilizes the rider's upper body strength directed in a forward motion to eliminate stress or soreness in the rider's lower arms allowing for a safer, more enjoyable ride.

SUMMARY OF THE INVENTION

Accordingly, it is a primary object of the present invention to provide a rotary device for displacing a bicycle brake cable to apply and release a bicycle brake including a housing mounted on a bicycle handlebar and an actuator rotatably connected with the housing. The actuator includes a handle which extends generally perpendicular to and radially from the bicycle handlebar and has an axis of rotation generally parallel to the handlebar. One end of the brake cable is connected with the actuator so that when the actuator is rotated in a first direction, the actuator pulls the brake cable to apply the bicycle brake. When the actuator is rotated in the other direction, the actuator pushes the brake cable to release the brake. A locking device is operable to fix the actuator relative to the housing in a brake release position.

According to a further object of the invention, the housing includes a spindle on which the actuator is mounted, and a snap ring is provided to connect the actuator with the housing.

In one embodiment, the housing contains a detent and the locking device comprises a pawl which is pivotally connected with the actuator to engage the detent to lock the actuator in the brake release position. A trigger release mechanism on the actuator is operable by the rider to release the pawl from the detent when it is necessary to rotate the actuator to apply the brake.

In a preferred alternate embodiment, the housing contains an aperture and the locking device comprises a rigid pin reciprocally connected with the actuator to engage the aperture to lock the actuator in the brake release position.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
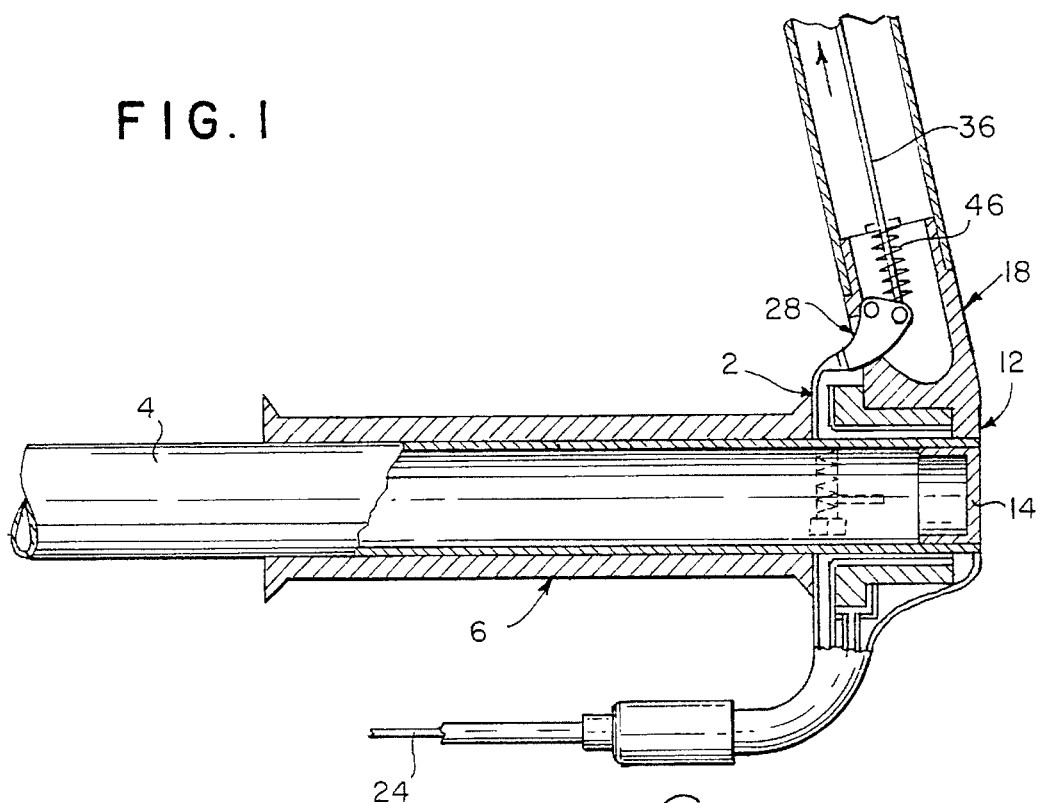
FIG. 1 is a sectional view of the rotary device for actuating a bicycle brake according to the invention.
Figure 3:
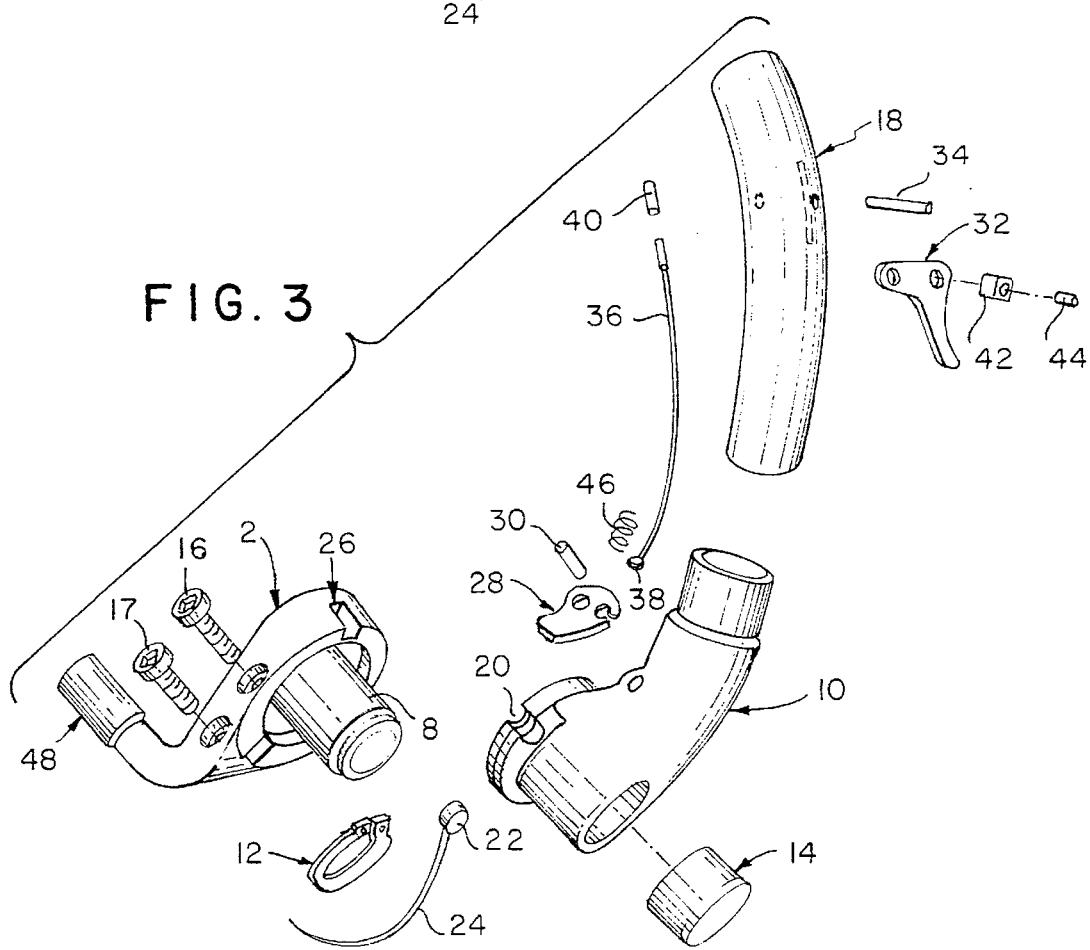
FIG. 3 is an exploded view of the device of FIG. 1.

As shown in FIG. 1, the rotary device for operating a bicycle brake includes a housing 2 mounted on the end of a bicycle handlebar 4 adjacent a handgrip 6. Referring to FIG. 3, the housing includes a spindle 8 coaxial with the axis of the bicycle handlebar 4. Mounted on the housing spindle is an actuator 10 adapted for rotation about the handlebar axis. A snap ring 12 is arranged between the housing spindle and the actuator to connect the actuator with the housing as shown in FIG. 1. An end cap 14 plugs the opening in the actuator and the housing spindle.

The housing and spindle are preferably formed of a low friction nylon or other rigid synthetic plastic material, and the housing is formed of a lightweight durable metal such as aluminum. This combination provides easy rotary movement of the actuator with respect to the housing. Alternatively, ball bearings (not shown) may be provided between the spindle and the actuator to facilitate rotary movement of the actuator. A first screw 16 threaded through an opening in the housing can be adjusted to press against the actuator to control the rotary play of the actuator. A second screw 17 connects the housing 2 to the handlebar 4.

The actuator includes a handle 18 that extends generally radially from the axis of the bicycle handlebar. The handle is operable to rotate the actuator with respect to the housing. The actuator includes a recess 20 for receiving a ball 22 at the end of the brake cable 24 which is threaded through the housing 2 as shown in FIG. 1. The portion of the actuator containing the recess is surrounded by the housing 2 when the actuator is connected therewith to retain the brake cable ball in the recess 20. Rotation of the actuator by the handle in the forward direction about the handlebar axis thus pulls on the brake cable 24 and squeezes the brake calipers (not shown) to apply the brake. Rotation of the actuator in the other direction pushes the brake cable to release the brake calipers. A stop (not shown) in the actuator prevents rotation about the handlebar axis through more than 360° in the event the brake cable breaks.

A locking mechanism is provided to retain the actuator in the brake release position for free-wheeling of the bicycle.

Figure 2:
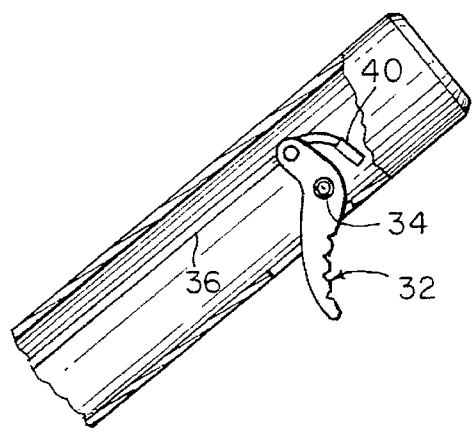
FIG. 2 is a detailed sectional view of the locking release mechanism of the invention.

More particularly, the housing 2 includes a detent 26 and the actuator has a pawl 28 pivotally connected therewith via a pivot pin 30. The pawl is pivotable to engage the housing detent 26 or be released therefrom. In order to release the pawl, a trigger 32 is pivotally connected with handle 18 via a pivot pin 34 as shown in FIGS. 2 and 3. Arranged between the trigger 32 and the pawl 28 is a release cable 36 having a ball 38 at one end for engaging a recess on the pawl 28 and a fitting 40 on the other end. The cable engages a bushing 42 connected with the trigger 32 by a screw 44. A spring 46 between the handle and the pawl normally biases the pawl to engage the detent and lock the actuator in the brake release position. Actuation of the trigger by the user pulls on the pawl via the release cable and pivots the pawl out of the detent to release the actuator for rotation to apply the brake.

Figure 4:
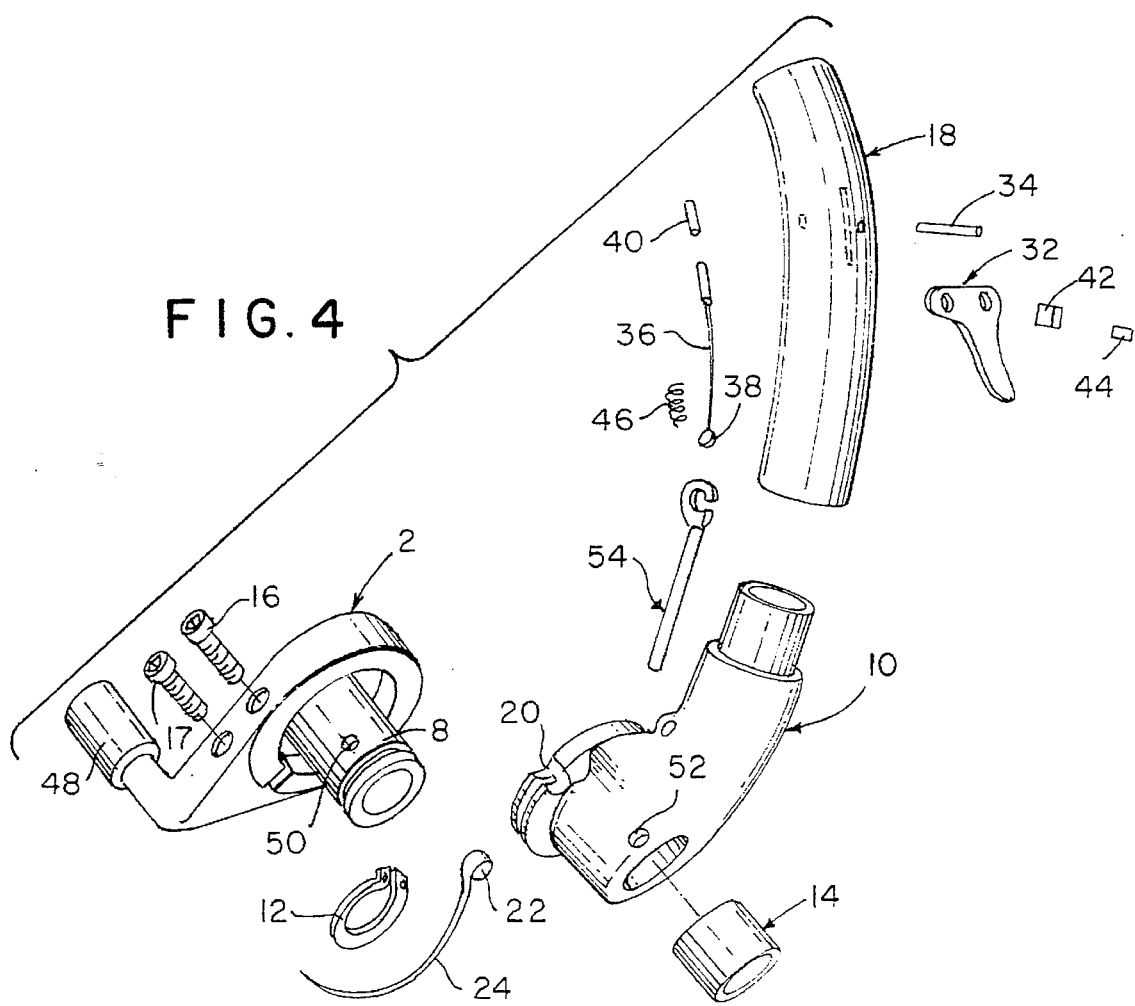
FIG. 4 is an exploded view of the preferred embodiment of the device of FIG. 1.

In FIG. 4 there is shown an alternate and preferred embodiment of the locking mechanism. Like elements of the actuator of FIG. 3 have the same reference numerals in FIG. 4. However, the housing spindle 8 contains a radial opening 50 and the actuator 10 contains a radial opening 52 which is aligned with the opening 50 when the actuator is in the brake release position. A rigid locking pin 54 is connected with the ball end 38 of the release cable 36 and is reciprocally mounted within the opening 50 to prevent rotation of the actuator relative to the housing spindle. When braking action is desired, the trigger 32 is actuated to pull the cable 36 and the pin 54 from the spindle opening 50, thereby freeing the actuator for rotation to apply the brake.

Because the rotary actuator is operated by pushing forward on the handle to apply the brake, less wear and stress to the rider's forearms are provided. That is, the rotary actuator of the invention uses the rider's upper body strength directed in a forward motion on the handle to apply tension to the brake cable.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. Apparatus for displacing a bicycle brake cable to apply and release a bicycle brake, comprising (a) a housing mounted on a bicycle handlebar, said housing including a spindle;

(b) an actuator mounted on said housing spindle, one end of the brake cable being connected with said actuator, said actuator including a handle which extends generally radially from the bicycle handlebar and having an axis of rotation generally parallel to the bicycle handlebar;

(c) means for connecting said actuator with said spindle; and (d) means for releasably locking said actuator with respect to said housing, whereby when said actuator is rotated in a first direction with respect to said housing, said actuator pulls the brake cable to apply the bicycle brake, and when said actuator is rotated in a second direction with respect to said housing, said actuator pushes the brake cable to release the bicycle brake and said locking means fixes said actuator in a brake release portion.

2. Apparatus as defined in claim 1, wherein said connecting means comprises a snap ring.

3. Apparatus as defined in claim 2, wherein said housing and said spindle are formed of a low-friction material.

4. Apparatus as defined in claim 1, wherein said housing contains a detent and said locking means comprises a pawl pivotally connected with said actuator, said pawl engaging said housing detent to lock said actuator in the brake release position.

5. Apparatus as defined in claim 4, and further comprising means for releasing said pawl from said detent to permit rotation of said actuator to apply and release the bicycle brake.

6. Apparatus as defined in claim 5, wherein said releasing means comprises a spring-biased cable connected with said pawl for pivoting said pawl between locked and released positions.

7. Apparatus as defined in claim 6, wherein said releasing means further comprises a trigger mounted on said actuator and connected with said spring-biased cable.

8. Apparatus as defined in claim 1, and further comprising means connected with said housing for adjusting the rotary plug of said actuator relative to said housing.

9. Apparatus as defined in claim 1, and further comprising means connected with said housing for adjusting the brake cable.

10. Apparatus as defined in claim 1, wherein said housing spindle contains a radial opening and said locking means comprises a pin reciprocally connected with said actuator, said pin engaging said spindle opening to lock said actuator in the brake release position.

11. Apparatus as defined in claim 10, and further comprising means for releasing said pin from said opening to permit rotation of said actuator to apply and release the bicycle brake.

12. Apparatus as defined in claim 11, wherein said releasing means comprises a spring-biased cable connected with said pin for reciprocating said pin between locked and released positions.

13. Apparatus as defined in claim 12, wherein said releasing means further comprises a trigger mounted on said actuator and connected with said spring-biased cable.

* * * * *